United States Patent
Shioda et al.

(10) Patent No.: US 10,632,935 B2
(45) Date of Patent: Apr. 28, 2020

(54) VEHICLE INTERIOR COMPONENT

(71) Applicant: TOYOTA BOSHOKU KABUSHIKI KAISHA, Aichi (JP)

(72) Inventors: Takeru Shioda, Aichi-ken (JP);
Tadashi Suzuki, Aichi-ken (JP);
Tetsuya Narimatsu, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 164 days.

(21) Appl. No.: 16/041,328

(22) Filed: Jul. 20, 2018

(65) Prior Publication Data

US 2019/0039533 A1    Feb. 7, 2019

(30) Foreign Application Priority Data

Aug. 3, 2017    (JP) .................................. 2017-150395

(51) Int. Cl.
*B60R 13/02* (2006.01)
*F16B 5/06* (2006.01)

(52) U.S. Cl.
CPC ...... *B60R 13/0206* (2013.01); *B60R 13/0243* (2013.01); *F16B 5/0657* (2013.01)

(58) Field of Classification Search
CPC .... B60J 5/0469; B60R 13/02; B60R 13/0206; B60R 13/0243; F16B 5/0657
USPC ............................................ 296/1.08, 146.7
See application file for complete search history.

(56) References Cited

U.S. PATENT DOCUMENTS

| 9,248,787 B2 * | 2/2016 | Hinokio | .............. B60R 13/0206 |
| 2014/0300133 A1 * | 10/2014 | Hinokio | .............. B60R 13/0206 296/146.7 |
| 2014/0306481 A1 * | 10/2014 | Hinokio | .............. B60R 13/0206 296/146.7 |
| 2017/0050584 A1 * | 2/2017 | Knieper | .............. B60R 13/0206 |

FOREIGN PATENT DOCUMENTS

JP          2009-173197          8/2009

* cited by examiner

*Primary Examiner* — Jason S Daniels
(74) *Attorney, Agent, or Firm* — Greenblum & Bernstein, P.L.C.

(57) ABSTRACT

A vehicle interior component includes a first board and a second board assembled together. The first board includes a design portion, a peripheral wall portion, and a flange portion. The second board includes a main wall portion and a clip mount portion. The clip mount portion includes an extending portion, a mount base, and at least one leg. The extending portion extends from an edge of the second board toward the first board and is fixed to the flange portion of the first board. The mount base is disposed parallel to and away from a back surface of the design portion and coupled with the extending portion. The at least one leg protrudes from the mount base toward the back surface of the design portion with a clearance between the at least one leg and the peripheral wall portion. The at least one leg is coupled with the extending portion.

10 Claims, 7 Drawing Sheets

VEHICLE INTERIOR COMPONENT

CROSS REFERENCE TO RELATED APPLICATION

This application claims priority from Japanese Patent Application No. 2017-150395 filed on Aug. 3, 2017. The entire contents of the priority application are incorporated herein by reference.

TECHNICAL FIELD

The present disclosure relates to a vehicle interior component.

BACKGROUND

A known door trim, which is an example of a vehicle interior component, includes a flat portion, a raised wall portion, a flange portion, and a clip mount. The raised wall portion is angled relative to the flat portion. The flange portion juts out a distal end of the raised wall. The clip mount is formed in a section of the vehicle interior component including a boundary between the raised wall portion and the flange portion. The clip mount protrudes from a section the back surface of the door trim including a boundary between the raised wall portion and the flange portion. Legs of the clip mount do not contact the flat portion. Namely, the clip mount is not supported by the flat portion. Therefore, the clip mount may deform in side collision and thus an impact can be effectively absorbed.

Although the legs of the clip mount are not supported by the flat portion, the legs are coupled with the raised wall. In the side collision, external forces concentrate on boundaries between the raised wall and the legs. This may cause cracks in the design surface of the door trim. On the other hand, the raised wall of the door trim may not properly deform and thus may not properly function as a shock absorber due to the clip mount.

SUMMARY

The present invention was made in view of the foregoing circumstances. An object is to provide a vehicle interior component that has sufficient strength and provides high shock absorbing performance to contribute to occupant protection in a collision.

A vehicle interior component includes a first board, a second board, and a clip mount portion. The first board includes a design portion, a peripheral wall portion, and a flange portion. The design portion includes a design surface and a back surface on an opposite side from the design surface. The design surface is a part of an interior wall surface of a vehicle. The peripheral wall portion protrudes from an edge of the back surface of the design portion. The flange portion protrudes from a distal end of the peripheral wall portion in a direction away from the deign portion. The second board is fixed to the first board. The second board includes a main wall portion and a clip mount portion. The main wall portion includes a front surface that is disposed adjacent to the disposed adjacent to the design surface and to be a part of the interior wall surface of the vehicle and a back surface on an opposite side from the front surface. The clip mount portion includes at least one extending portion, a mount base, and at least one leg. The at least one extending portion extends from an edge of the second board toward the first board and fixed to the flange portion of the first board. The edge of the second board is adjacent to the first board. The mount base is configured to hold a clip. The mount base is disposed parallel to and away from the back surface of the design portion and coupled with the extending portion. The at least one leg protrudes from the mount base toward the back surface of the design portion of the first board with a clearance between the at least one leg and the peripheral wall portion of the first board. The at least one leg is coupled with the least one extending portion.

Because the clip mount portion is a portion of the second board but not a portion of the first board that includes the design portion, the clip mount portions is less likely to cause cracks in the first board. This is more likely to contribute to proper occupant protection. Because the at least one extending portion of the clip mount portion, which is a portion of the second board, is fixed to the flange portion of the first board, the at least one extending portion fix not only the clip mount portion to the first board but also the second board to the first board. Namely, the number of parts can be reduced.

According to the technology described herein, a vehicle interior component that has sufficient strength and provides high shock absorbing performance to contribute to occupant protection in a collision is provided.

DETAILED DESCRIPTION

Figure 1:
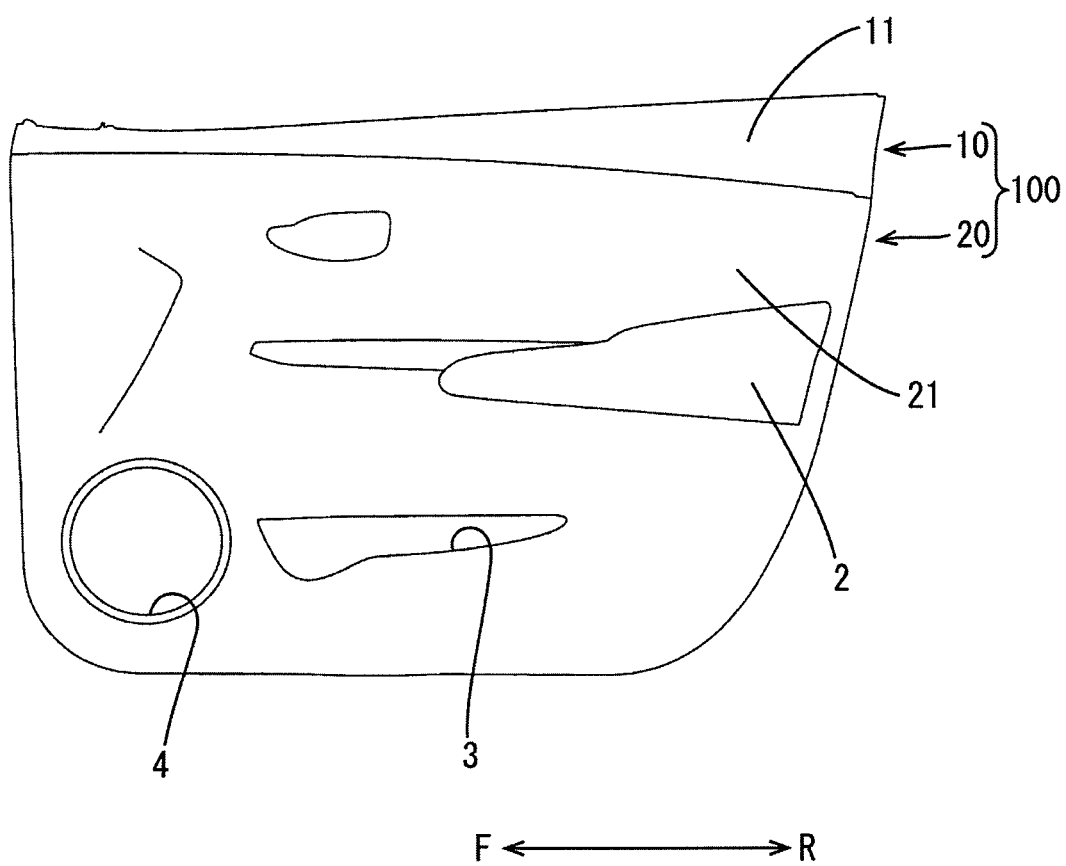
FIG. 1 is an elevated view of a front side (an interior side) of a door trim.
Figure 2:
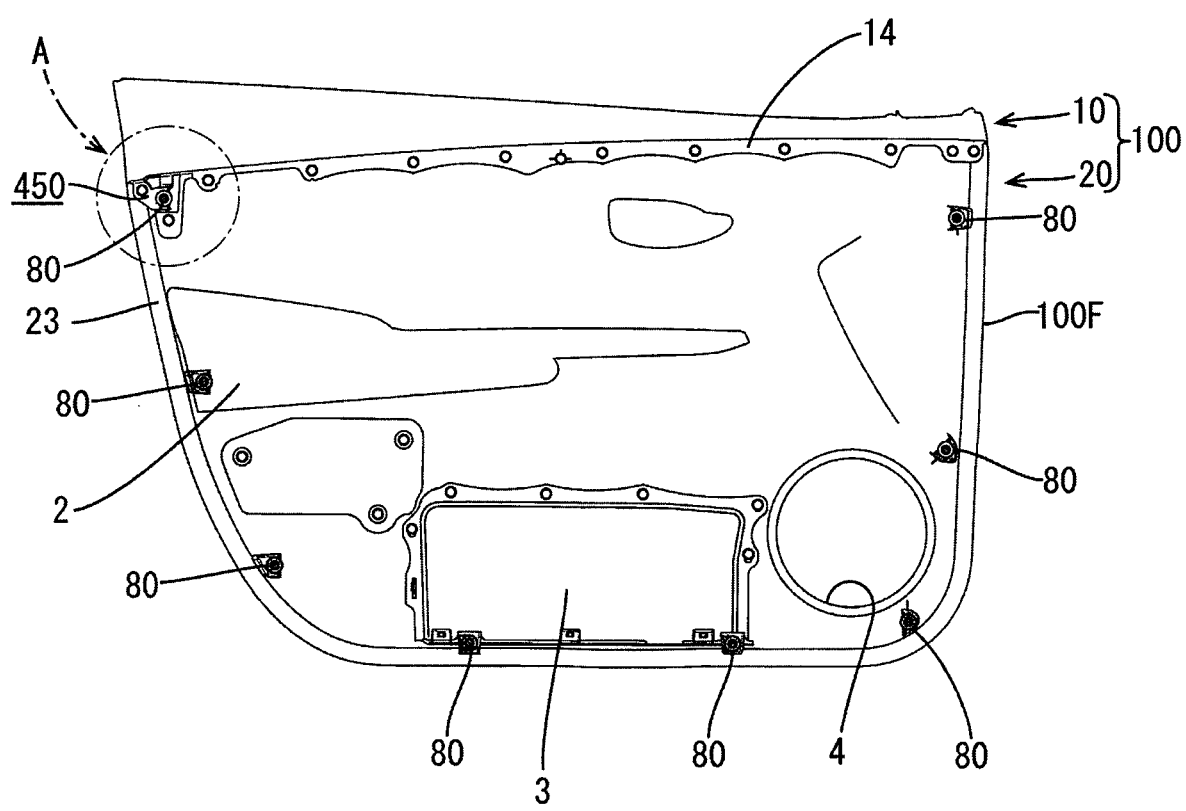
FIG. 2 is an elevated view of a back side (an exterior side) of the door trim.

An embodiment will be described with reference to FIGS. 1 to 7. In FIGS. 1 and 2, letters F and R indicate a front side and a rear side of a vehicle, that is, the double arrow indicates the front-rear direction of the vehicle. A door trim 100, which is an example of a vehicle interior component, will be described. As illustrated in FIG. 1, the door trim 100 to be installed in the vehicle to form a part of an interior wall of the vehicle includes an upper board 10 (a second board) and a lower board 20 (a first board). The upper board 10 and the lower board 20 form an upper portion and a lower portion of the door trim 100, respectively. The upper board 10 and the lower board 20 are disposed adjacent to each other and assembled. The door trim 100 having a single board shape as a whole is made of synthetic resin such as polypropylene. An armrest 2 on which an occupant can rest his or her arm is disposed at the middle of the door trim 100 in the vertical direction of the vehicle. A door pocket 3 and a speaker grille 4 are disposed below the armrest 2.

The door trim 100 is to be fixed to a door inner panel with clips 80 illustrated in FIG. 2. The clips 80 are disposed along an outer peripheral edge 100F of the door trim 100. It is preferable that the clips 80 are disposed as close as possible to the outer peripheral edge 100F of the door trim 100 for stable fixation of the door trim 100 to the door inner panel. The door trim 100 includes a boundary clip mount portion 450 (a clip mount portion) and lower board clip mount portions. The clips 80 are attached to the boundary clip mount portion 450 and the lower board clip mount portions. The boundary clip mount portion 450 is provided at a boundary between the upper board 10 and the lower board 20 (see circular area A in FIG. 2).

Figure 4:
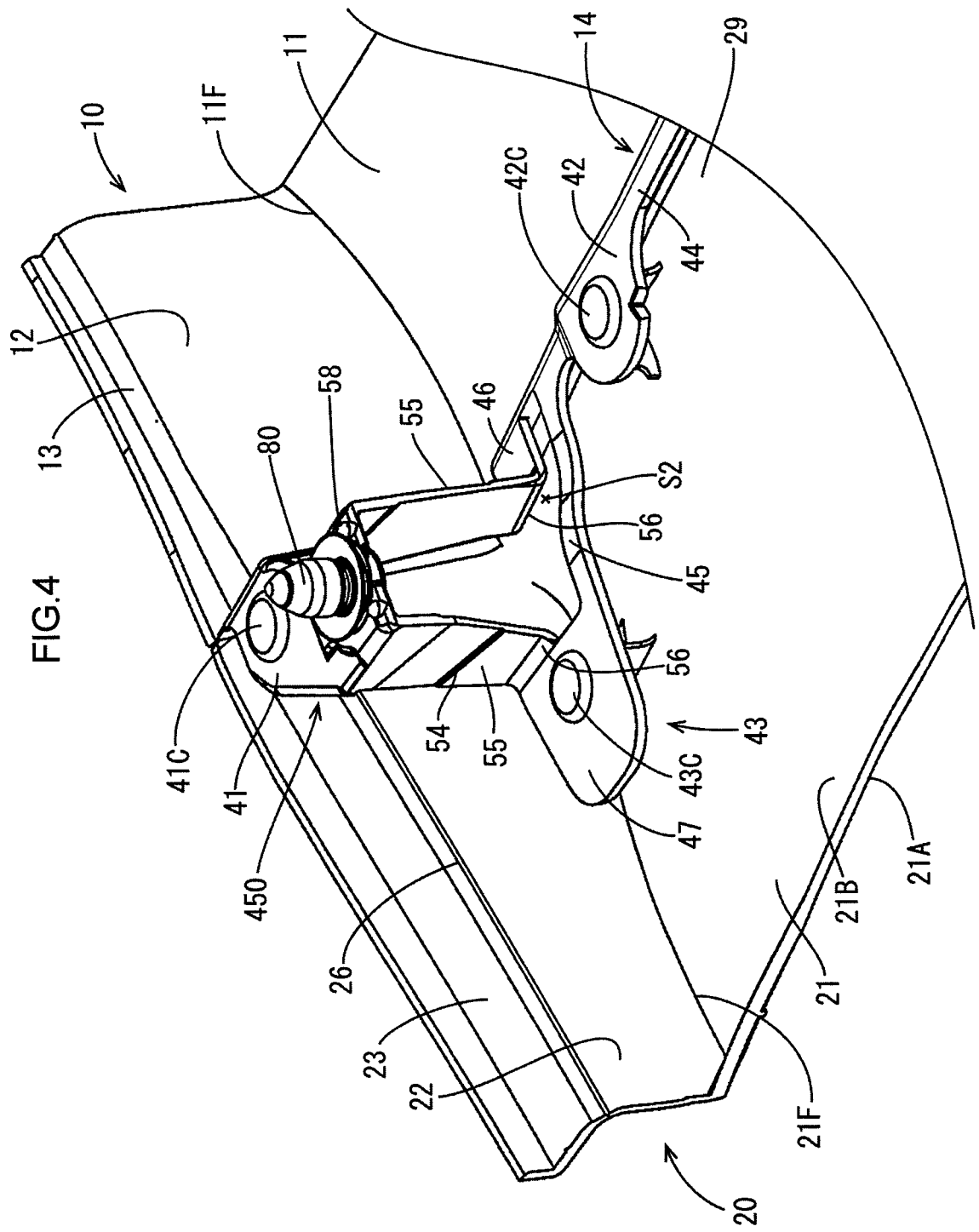
FIG. 4 is a magnified view of the section of the door trim viewed in direction Y1 in FIG. 3.

Prior to detailed description of the upper board 10, the lower board 20 will be described. As illustrated in FIG. 4, the lower board 20 includes a lower design portion 21, a lower peripheral wall portion 22, and a lower flange portion 23. The lower design portion 21 includes a design surface 21A that faces the interior of the vehicle when the door trim 100 is installed in the vehicle and a back surface 21B that is on the opposite side from the design surface 21A. The lower peripheral wall portion 22 protrudes from a lower outer peripheral edge 21F of the lower design portion 21 to the opposite side from the design surface 21A (toward the exterior side of the vehicle when the door trim 100 is installed in the vehicle). The lower flange portion 23 projects outward (away from the lower design portion 21) from the distal end of the lower peripheral wall portion 22. The lower peripheral wall portion 22 includes a groove 26. With the groove 26, the lower peripheral wall portion 22 can more easily collapse in a side collision.

As illustrated in FIG. 4, the upper board 10 includes an upper design portion 11 (a main wall portion), an upper peripheral wall portion 12, an upper flange portion 13, and a lower-edge flange portion 14. The upper design portion 11 includes a front surface that faces the interior of the vehicle when the door trim 100 is installed in the vehicle. In FIG. 4, a back surface of the upper design portion 11 on an opposite side from the upper design surface is illustrated. The upper peripheral wall portion 12 projects from an upper outer peripheral edge 11F of the upper design portion 11 to the opposite side from the upper design surface (toward the exterior side of the vehicle when the door trim 100 is installed in the vehicle). The upper flange portion 13 projects outward (away from the upper design portion 11) from a distal end of the upper peripheral wall portion 12.

Figure 3:
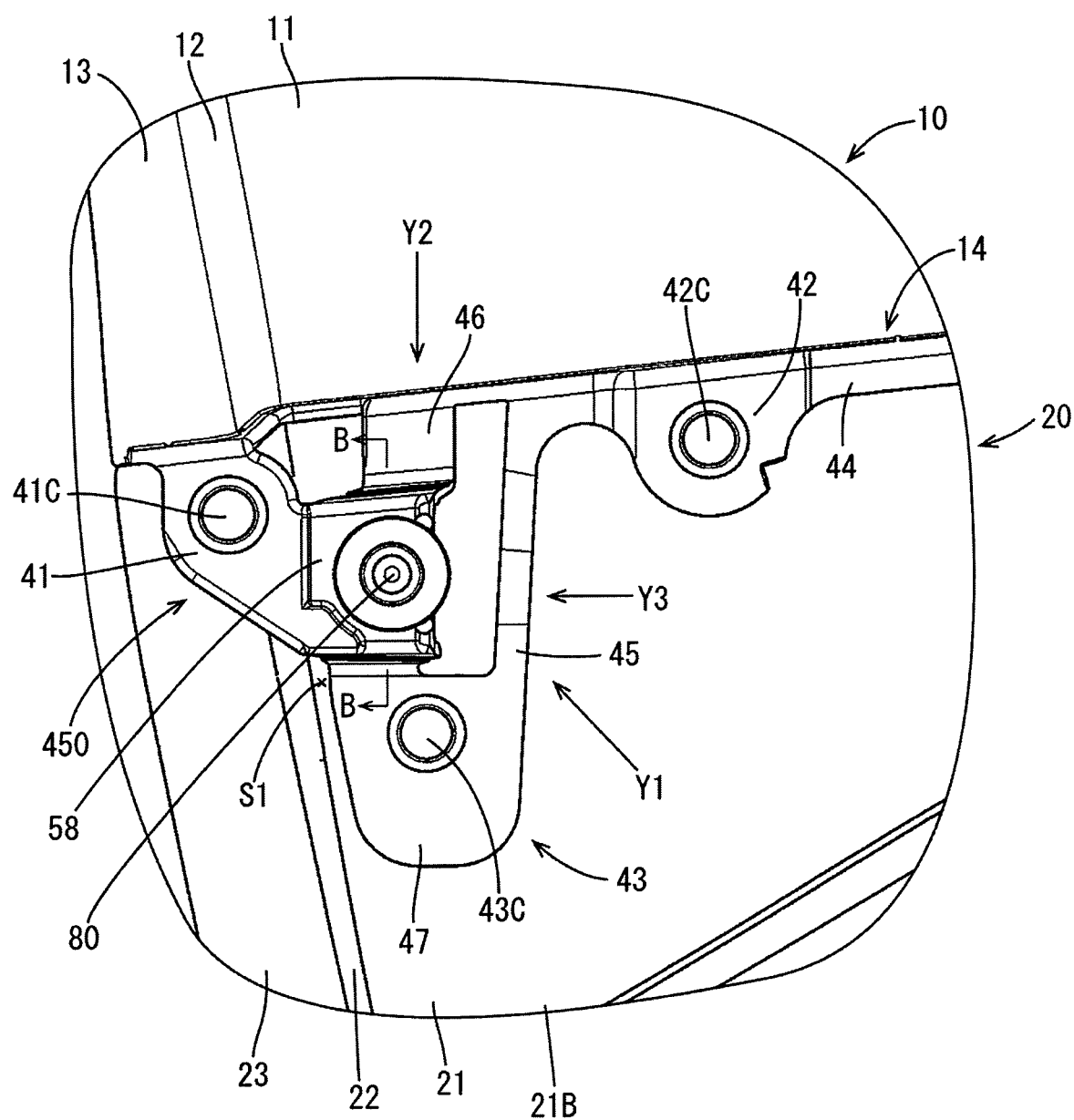
FIG. 3 is a magnified view of a section of the door trim indicated by a chain-line circle and reference sign A in FIG. 2.

As illustrated in FIG. 2, the lower-edge flange portion 14 projects from a lower edge of the upper board 10 toward the lower board 20. The lower-edge flange portion 14 has an elongated shape with a long dimension in the front-rear direction of the vehicle. The lower-edge flange portion 14 includes a first extending portion 41, a second extending portion 42, a third extending portion 43, and a fourth extending portion 44. The first extending portion 41, the second extending portion 42, and the third extending portion 43 are located closer to the rear edge of the upper board 10. The fourth extending portion 44 has an elongated shape that extends in the front-rear direction for about an entire lower edge of the upper board 10 except for a section of the lower edge from which the first extending portion 41, the second extending portion 42, and the third extending portion 43 project. As illustrated in FIGS. 3 and 4, the first extending portion 41, the second extending portion 42, the third extending portion 43 form a part of the boundary clip mount portion 450 of the upper board 10.

As illustrated in FIG. 4, the boundary clip mount portion 450 includes a mount base 58 and two legs 55. Namely, the boundary clip mount portion 450 consists of the mount base 58, the legs 55, the first extending portion 41, the second extending portion 42, and the third extending portion 43.

The first extending portion 41 extends from a lower edge of the upper flange portion 13 over a back surface of the lower flange portion 23 of the lower board 20 and has a plate shape. The second extending portion 42 extends from a section of the lower edge of the upper design portion 11 adjacent to the forth extending portion 44. The second extending portion 42 extends over the back surface 21B of the lower design portion 21 of the lower board 20 and has a plate shape. The second extending portion 42 is coupled with a rear end of the forth extending portion 44. The third extending portion 43 extends from a section of the lower edge of the upper design portion 11 between the first extending portion 41 and the second extending portion 42 to the lower design portion 21 of the lower board 20. The mount base 58 is coupled with the first extending portion 41. The legs 55 protrude from edges of the mount base 58 and include distal ends that are coupled with the third extending portion 43.

The third extending portion 43 has an inverted irregular rectangular C shape. The third extending portion 43 includes a first section 45, a second section 46, and a third section 47. The first section 45 has an L shape including a section that extends along the section of the lower edge of the upper design portion 11 and a section that extends toward the lower edge of the lower board 20. The corner of the first section 45 is coupled with the front edge end of the second extending portion 42. The second section 46 has a rectangular shape and extends from the section of the first section 45 extending along the lower edge of the upper design portion 11 toward the lower edge of the lower board 20. The third section 47 has a rectangular shape and extends from an end of the first section 45 away from the lower edge of the upper design portion 11.

A dimension of the second section 46 in the front-rear direction is greater than that of the section of the first section 45 extending toward the lower edge of the lower board 20. A dimension of the third section 47 in the front-rear direction is greater than that of the second section 46. The third extending portion 43 projects from the lower edge of the upper design portion 11 farther than the first extending portion 41 and the second extending portion 42 (toward the lower edge of the lower board 20.

The mount base 58 has a rectangular plate shape and extends from an edge of the first extending portion 41 on an opposite side from the rear side of the lower board 20 toward the front side of the lower board 20. The mount base 58 includes a through hole in which the clip 80 is fitted to hold the clip 80. The mount base 58 is disposed parallel to the lower design portion 21 of the lower board 20. The legs 55 extend from a first edge and a second edge of the mount base 58 opposite to each other in the vertical direction of the door trim 100 toward the back surface 21B. Namely, the legs 55 extend in the width direction of the vehicle when the door trim 100 is installed in the vehicle. The legs 55 include distal ends 56 that are coupled with the second section 46 and the third section 47 of the third extending portion 43, respectively. The legs 55 include grooves 54 in the outer surfaces. Therefore, the thickness of sections of the legs 55 including the grooves 54 is less than the thickness of other sections of the legs 55 and thus the sections including the grooves 54 have less strength in comparison to other sections.

The lower flange portion 23 includes a boss 41C that protrudes from a back surface of the lower flange portion 23 at a position corresponding to the first extending portion 41 that includes a through hole to receive the boss 41C. The lower design portion 21 includes bosses 42C and 43C that protrude from the back surface 21B of the lower design portion 21. The boss 42C is located at a position corresponding to the second extending portion 42 that includes a through hole to receive the boss 42C. The boss 43C is located at a position corresponding to the third extending portion 43 that includes a through hole to receive the boss 43C. The lower-edge flange portion 14 is placed over the lower board 20 such that the bosses 41C to 43C are inserted in the respective through holes and the fourth extending portion 44 is placed over an upper edge section 29 of the lower board 20 (see FIG. 4). The bosses 41C, 42C, and 43C are fixed to the first extending portion 41, the second extending portion 42, and the third extending portion 43, respectively, through staking. The forth extending portion 44 is fixed to the upper edge section 29. Through the fixation of the extending portions 41 to 44 to the lower board 20, the upper board 10 and the lower board 20 are assembled.

Figure 5:
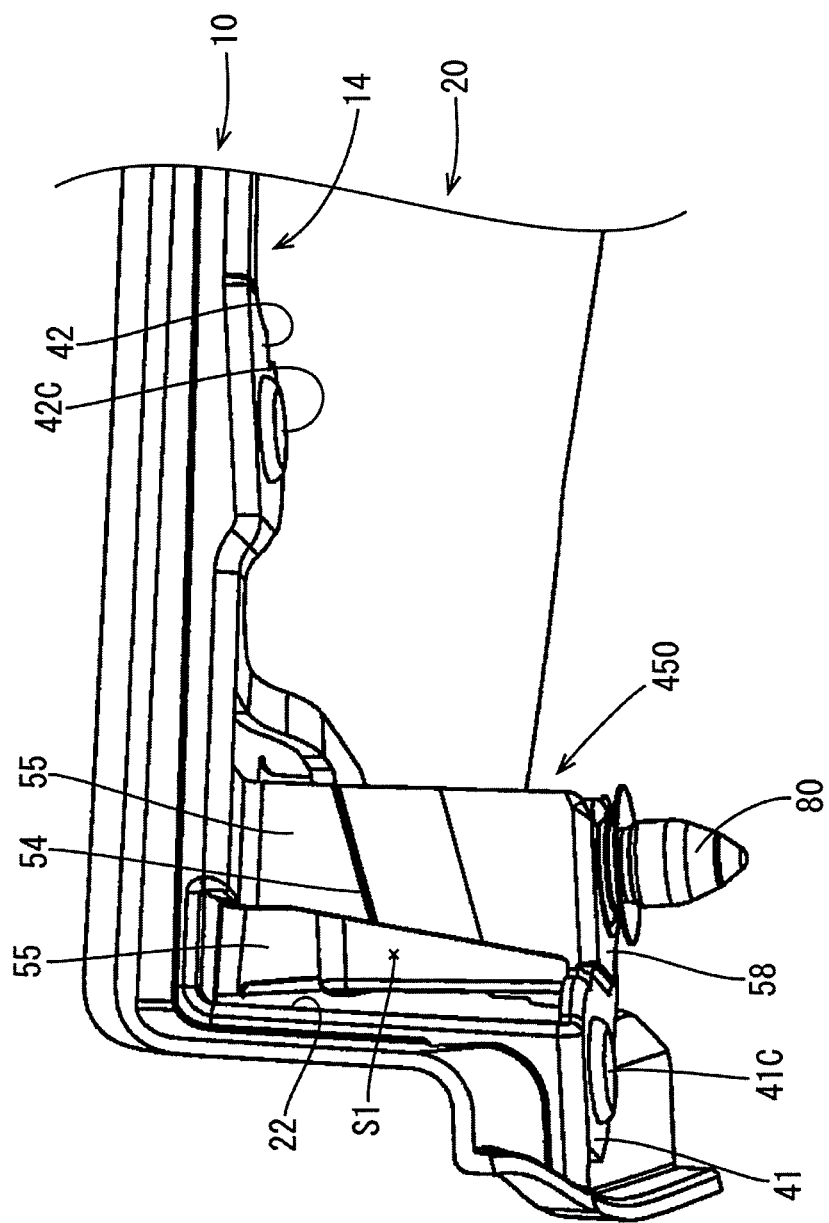
FIG. 5 is a magnified view of the section of the door trim viewed in direction Y2 in FIG. 3.
Figure 6:
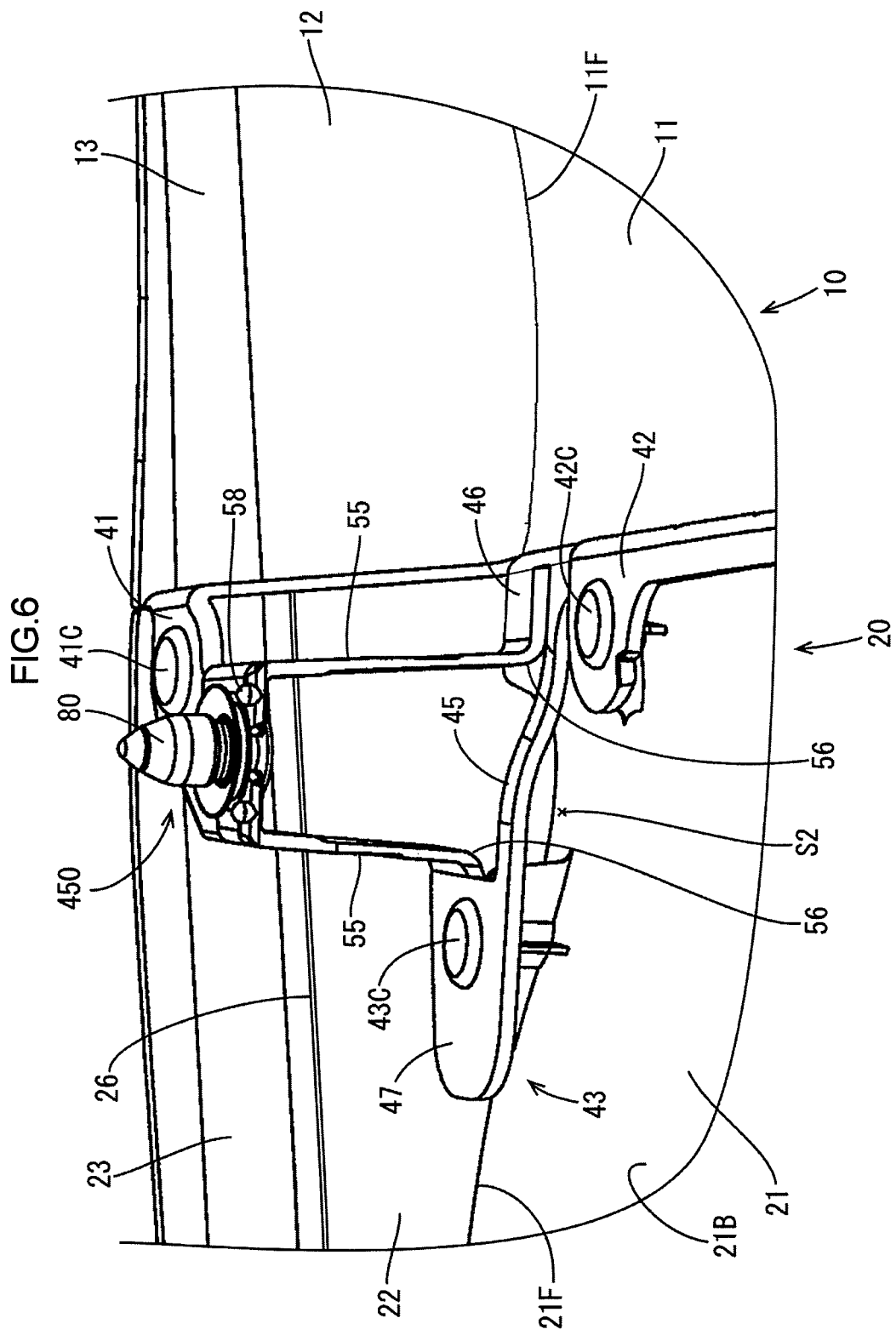
FIG. 6 is a magnified view of the section of the door trim viewed in direction Y3 in FIG. 3.
Figure 7:
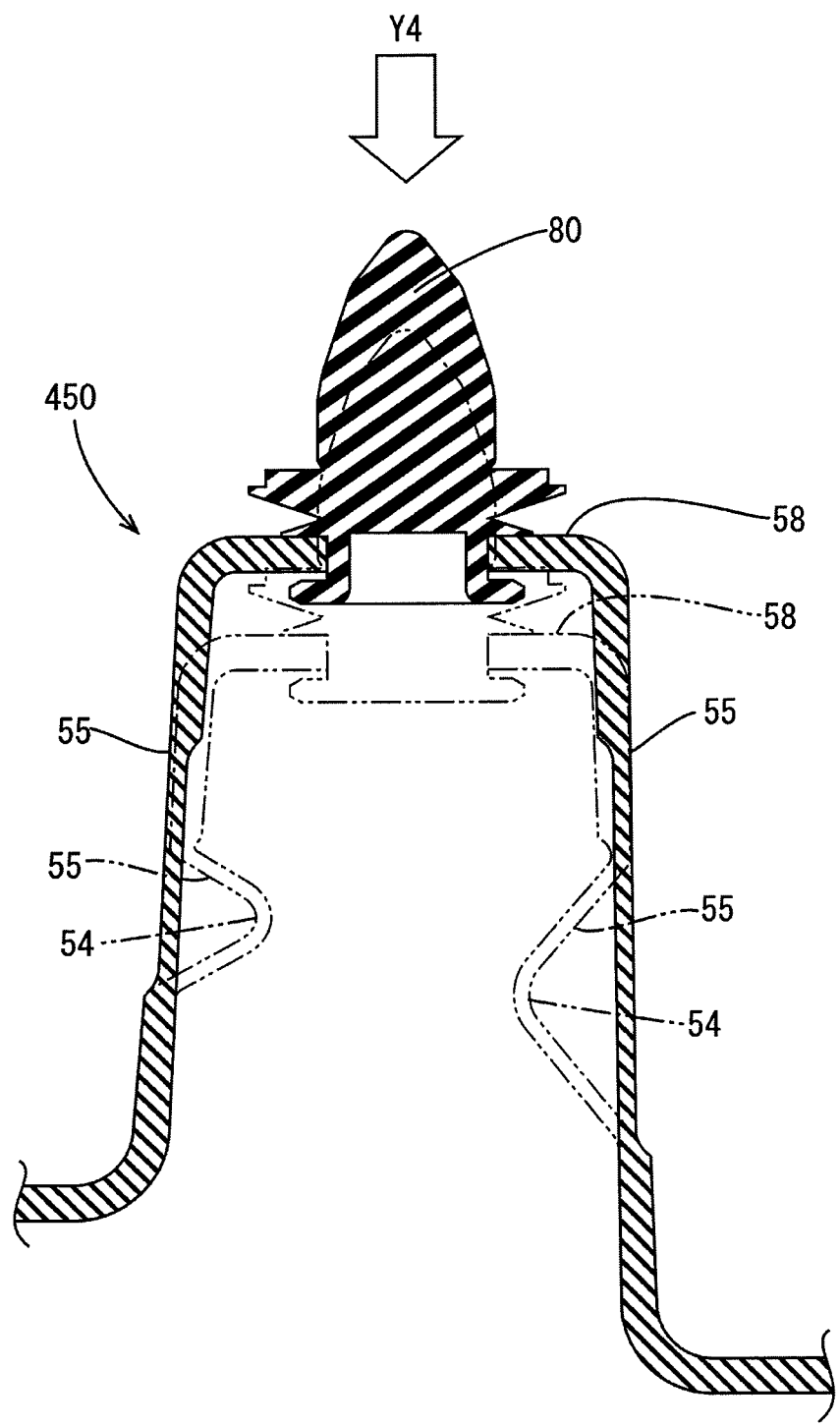
FIG. 7 is a cross-sectional view illustrating a clip mount portion and a clip along line B-B in FIG. 3.

The legs 55 are separated from the lower peripheral wall portion 22 with clearances S1 (see FIGS. 3 and 5). The upper edge section 29 of the lower board 20 gently curves away from the boundary clip mount portion 450. Namely, the distal ends 56 of the legs 55 are separated from the lower design portion 21 of the lower board 20 with clearances S2 (see FIGS. 4 and 6). As descried earlier, the legs 55 are coupled with the third extending portion 43 that is fixed to the back surface 21B of the lower design portion 21, that is, properly supported by the lower design portion 21; however, the legs 55 are less likely to hit hard on the lower design portion 21 because the clearances S2 is provided between the distal ends 56 of the legs 55 and the back surface 21B of the lower design portion 21. Furthermore, the legs 55 easily collapse because of the grooves 54. According to the configuration, harm on the occupant of the vehicle can be reduced.

The legs 55 and the third extending portion 43 may be considered as a leg of the boundary clip mount portion 450. Namely, the legs 55 and the third extending portion 43 may be considered as portions of the leg of the boundary clip mount portion 450. The third extending portion 43 of the boundary clip mount portion 450 is fixed to the back surface 21B of the lower design portion 21 of the lower board 20 but the distal ends 56 of the legs 55 coupled with the third extending portion 43 are separated from the back surface 21B of the lower design portion 21 and the lower peripheral wall portion 22. Namely, the leg of the boundary clip mount portion 450 is properly supported by the lower design portion 21 but the legs 55, which may be considered as portions of the leg of the boundary clip mount portion 450, are separated from the lower design portion 21 and the lower peripheral wall portion 22. Therefore, when an external force is applied to the boundary clip mount portion 450 in the width direction of the vehicle, the legs 55 are less likely to hit hard on the lower design portion 21 although the boundary clip mount portion 450 is properly supported by the lower design portion 21 in a normal condition. Furthermore, because the legs 55 can easily collapse in a side collision, the boundary clip mount portion 450 is less likely to do harm to the occupant of the vehicle.

The boundary clip mount portion 450 is a portion of the upper board 10 and disposed behind the lower board 20 and adjacent to the lower peripheral wall portion 22. Namely, the boundary clip mount portion 450 is not a portion of the lower board 20 but disposed adjacent to the lower peripheral wall portion 22 of the lower board 20. Furthermore, the clearance is provided between the first section 45 and the legs 55 that include the grooves 54. According to the configuration, when a force is applied to the boundary clip mount portion 450 in a direction indicated by arrow Y4 in FIG. 7, the legs 55 collapse at the grooves 54 and thus the boundary clip mount portion 450 collapses to absorb an impact. In comparison to a configuration in which the clearance is not provided between the third extending portion 43 and the legs 55, the boundary clip mount portion 450 in this embodiment more easily collapses. Furthermore, because the legs 55 are separated from the lower peripheral wall portion 22, the lower peripheral wall portion 22 is more likely to collapse without obstruction by the legs 55. With the groove 26, the lower peripheral wall portion 22 more easily collapses.

According to the door trim 100 having the configuration described above, the lower peripheral wall portion 22 more easily collapse to protect the occupant of the vehicle in comparison to a door trim that includes a clip mount portion integrally formed with a peripheral wall portion of a lower board that includes a design surface. Furthermore, because the boundary clip mount portion 450 is separated from the lower peripheral wall portion 22, the collapse of the lower peripheral wall portion 22 is less likely to cause cracks in the lower peripheral wall portion 22.

According to the two-leg configuration in which the mount base 58 is supported by two legs 55, the boundary clip mount portion 450 easily collapses. This improves the shock absorbing performance. In general, a clip mount portion having a simple two-leg configuration tends to have less strength; however, the mount base 58 of the boundary clip mount portion 450 is coupled with the first extending portion 41 that is fixed to the lower flange portion 23, that is, the mount base 58 is supported by the lower flange portion 23 via the first extending portion 41. Therefore, the boundary clip mount portion 450 has strength greater than strength of the clip mount portion having the simple two-leg configuration.

Furthermore, because the boundary clip mount portion 450 is not a portion of the lower board 20 and the legs 55 are separated from the lower peripheral wall portion 22 of the lower board 20 although the boundary clip mount portion 450 is disposed behind the lower design portion 21, the boundary clip mount portion 450 is less likely to be a cause of cracks in the lower board 20. The boundary clip mount portion 450 contributes to the occupant protection.

The first extending portion 41, the second extending portion 42, and the third extending portion 43 of the boundary clip mount portion 450 are fixed to the lower board 20. Namely, the boundary clip mount portion 450 functions as a fixture to fix the upper board 10 to the lower board 20. Therefore, the number of parts can be reduced.

OTHER EMBODIMENTS

The technology described herein is not limited to the embodiment described in the above description and the drawings. The technology described herein may include the following embodiments.

The technology described herein can be applied to interior components of trains, amusement rides, airplanes, helicopters, vessels, and underwater vehicles.

The invention claimed is:
1. A vehicle interior component comprising:
a first board comprising:
a design portion including a design surface and a back surface on an opposite side from the design surface, the design surface being a part of an interior wall surface of a vehicle;
a peripheral wall portion protruding from an edge of the back surface of the design portion; and a flange portion protruding from a distal end of the peripheral wall portion in a direction away from the design portion; and a second board fixed to the first board, the second board comprising:
  a main wall portion including a front surface disposed adjacent to the design surface and to be a part of the interior wall surface of the vehicle and a back surface on an opposite side from the front surface; and
  a clip mount portion comprising:
    at least one extending portion extending from an edge of the second board toward the first board and fixed to the flange portion of the first board, the edge of the second board being adjacent to the first board;
    a mount base configured to hold a clip, the mount base being disposed parallel to and away from the back surface of the design portion and coupled with the extending portion; and
    at least one leg protruding from the mount base toward the back surface of the design portion of the first board with a clearance between the at least one leg and the peripheral wall portion of the first board, the at least one leg being coupled with the at least one extending portion.

2. The vehicle interior component according to claim 1, wherein
  the at least one leg includes a distal end disposed with a clearance between the at least one leg and the back surface of the design portion, and
  the at least one leg includes a portion having strength less than strength of other portion of the at least one leg.

3. The vehicle interior component according to claim 1, wherein
  the second board comprises:
    a peripheral wall portion protruding from an edge of the back surface of the main wall portion; and
    a flange portion protruding from a distal end of the peripheral wall portion of the second board in a direction away from the main wall portion,
  the peripheral wall portion and the flange portion of the second board are disposed adjacent to the peripheral wall portion and the flange portion of the first board, respectively,
  the edge of the second board includes an edge of the main wall portion, an edge of the peripheral wall portion, and an edge of the flange portion, and
  the edge of the main wall portion, the edge of the peripheral wall portion, and the edge of the flange portion are disposed adjacent to an edge of the design portion, an edge of the peripheral wall portion, and an edge of the flange portion of the first board, respectively.

4. The vehicle interior component according to claim 3, wherein
  the at least one extending portion includes a first extending portion, a second extending portion, and a third extending portion,
  the first extending portion extends from the edge of the flange portion of the second board over a back surface of the flange portion of the first board,
  the first extending portion is coupled with the mount base and fixed to the flange portion of the first board,
  the second extending portion extends from a section the edge of the main wall portion away from the first extending portion over the back surface of the design portion of the first board,
  the third extending portion extends from a section of the edge of the main wall portion between the first extending portion and the second extending portion, and
  the third extending portion is coupled with the distal end of the at least one leg and the second extending portion.

5. The vehicle interior component according to claim 4, wherein
  the first extending portion extends over the back surface of the design portion of the first board beyond a boundary between the flange portion and the peripheral wall portion of the first board, and
  the mount base is coupled with an edge of the first extending portion disposed over the back surface of the design portion of the first board.

6. The vehicle interior component according to claim 4, wherein
  the at least one leg includes a first leg protruding from a first edge of the mount base closer to the edge of the main wall portion of the second board and a second leg protruding from a second edge of the mount base away from the first edge,
  the first leg and the second leg include distal ends separated from the back surface of the design portion of the first board,
  the third extending portion includes a first section, a second section, and a third section,
  the first section has an L shape extending from the section of the edge of the main wall portion of the second board in a direction along the edge of the main wall and in a direction at an angle relative to the edge of the main wall portion,
  the second section extends from an edge of the first section toward the distal end of the first leg,
  the third section extends from a distal end of the first section away from the edge of the main wall portion toward the distal end of the second leg, and
  the second section and the third section are coupled with the distal ends of the first leg and the second leg, respectively.

7. The vehicle interior component according to claim 6, wherein
  the first section and the second section of the third extending portion are separated from each other in a direction in which the edge of the second board extends, and
  the legs are separated from the first section of the third extending portion in the direction in which the edge of the second board extends.

8. The vehicle interior component according to claim 6, wherein
  the second extending portion and the third extending portion are separated from the back surface of the design portion,
  the first board includes bosses protruding from the back surface of the design portion at positions corresponding to the second extending portion and the third section of the third extending portion, and
  the bosses are fixed to the second extending portion and the third section of the third extending portion, respectively.

9. The vehicle interior component according to claim 8, wherein the second extending portion is disposed closer to the edge of the main wall portion than the third section of the third extending portion.

10. The vehicle interior component according to claim 1, wherein the at least one extending portion is fixed to the back surface of the design portion of the first board.

* * * * *